US009347333B2

United States Patent
Mindock, III (10) Patent No.: US 9,347,333 B2
(45) Date of Patent: May 24, 2016

(54) BRUSH RING SEAL

(75) Inventor: Michael Arthen Mindock, III, New Ringgold, PA (US)

(73) Assignee: Elliott Company, Jeannette, PA (US)

( * ) Notice: Subject to any disclaimer, the term of this patent is extended or adjusted under 35 U.S.C. 154(b) by 847 days.

(21) Appl. No.: 13/578,639

(22) PCT Filed: Apr. 27, 2011

(86) PCT No.: PCT/US2011/034075
§ 371 (c)(1),
(2), (4) Date: Oct. 5, 2012

(87) PCT Pub. No.: WO2011/139741
PCT Pub. Date: Nov. 10, 2011

(65) Prior Publication Data
US 2013/0094957 A1   Apr. 18, 2013

Related U.S. Application Data

(60) Provisional application No. 61/330,623, filed on May 3, 2010.

(51) Int. Cl.
*F01D 11/00* (2006.01)
*F01D 25/00* (2006.01)
*F01D 25/24* (2006.01)
*F02C 7/28* (2006.01)
*F16J 15/32* (2016.01)

(52) U.S. Cl.
CPC .............. *F01D 25/00* (2013.01); *F01D 11/003* (2013.01); *F01D 25/24* (2013.01); *F02C 7/28* (2013.01); *F16J 15/3288* (2013.01); *F05D 2240/56* (2013.01)

(58) Field of Classification Search
None
See application file for complete search history.

(56) References Cited

U.S. PATENT DOCUMENTS

| | | | | |
|---|---|---|---|---|
| 5,794,942 | A  * | 8/1998  | Vance et al. | 277/303 |
| 6,168,162 | B1 * | 1/2001  | Reluzco et al. | 277/355 |
| 6,318,728 | B1   | 11/2001 | Addis et al. | |
| 6,378,873 | B1 * | 4/2002  | Mayer et al. | 277/355 |
| 6,910,858 | B2   | 6/2005  | Addis | |
| 7,291,947 | B2 * | 11/2007 | Hashiba et al. | F16J 15/26 277/408 |

(Continued)

FOREIGN PATENT DOCUMENTS

| | | |
|---|---|---|
| EP | 1433928 A2 | 6/2004 |
| EP | 1873359 A2 | 1/2008 |

(Continued)

OTHER PUBLICATIONS

"Giving power loss the brush off," International Power Generation, Sep. 2004, pp. 15-16.

*Primary Examiner* — Ninh H Nguyen
*Assistant Examiner* — Justin Seabe
(74) *Attorney, Agent, or Firm* — The Webb Law Firm (57) ABSTRACT

A brush ring seal device for installation within a packing case of a turbine includes: a brush seal carrier having a substantially ring-shaped body portion having a front face, a rear face, an inner circumferential groove, and an outer circumferential groove; a brush seal mounted within the inner circumferential groove of the brush seal carrier; and a ring-shaped spring mounted within the outer circumferential groove of the brush seal carrier. The rear face of the brush seal carrier is coated with an anti-friction coating, thereby allowing movement of the brush ring seal device within the packing case.

8 Claims, 6 Drawing Sheets

(56) References Cited

U.S. PATENT DOCUMENTS

| | | | |
|---|---|---|---|
| 7,461,847 B2 * | 12/2008 | Short et al. | 277/355 |
| 2002/0050685 A1 * | 5/2002 | Kono | 277/355 |
| 2003/0223866 A1 | 12/2003 | Giesler et al. | |
| 2004/0090014 A1 | 5/2004 | Bylina et al. | |
| 2008/0003099 A1 | 1/2008 | Giesler et al. | |

FOREIGN PATENT DOCUMENTS

| | | |
|---|---|---|
| JP | 11311336 A | 11/1999 |
| JP | 20008810 A | 1/2000 |
| JP | 2002349209 A | 12/2002 |
| JP | 200314134 A | 1/2003 |
| JP | 200314137 A | 1/2003 |
| JP | 200468965 A | 3/2004 |
| JP | 2004162712 A | 6/2004 |
| JP | 2004169882 A | 6/2004 |
| JP | 2005248960 A | 9/2005 |
| JP | 2005344721 A | 12/2005 |
| JP | 2007521442 A | 8/2007 |
| JP | 200864260 A | 3/2008 |
| JP | 2008291844 A | 12/2008 |
| WO | 9906673 A1 | 2/1999 |
| WO | 2005031197 A1 | 4/2005 |

* cited by examiner

BRUSH RING SEAL

BACKGROUND OF THE INVENTION

1. Field of the Invention

The present invention, in general, is related to steam turbines, gas expanders, and industrial gas turbines and, more particularly, to a seal for sealing the radial gap between the rotor and the casing of the turbine.

2. Description of Related Art

Figure 1:
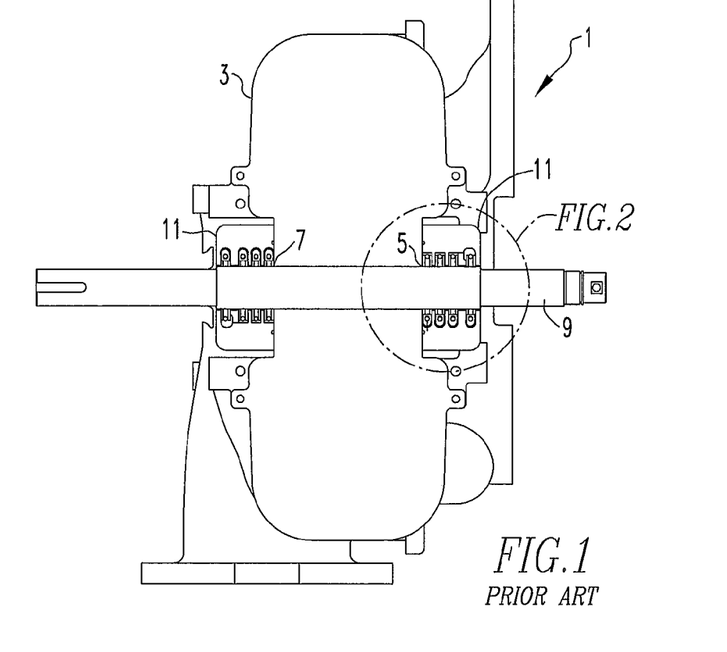
FIG. 1 is a top plan view of a steam turbine in partial cross-section that includes conventional carbon ring seals installed in packing boxes.
Figure 2:
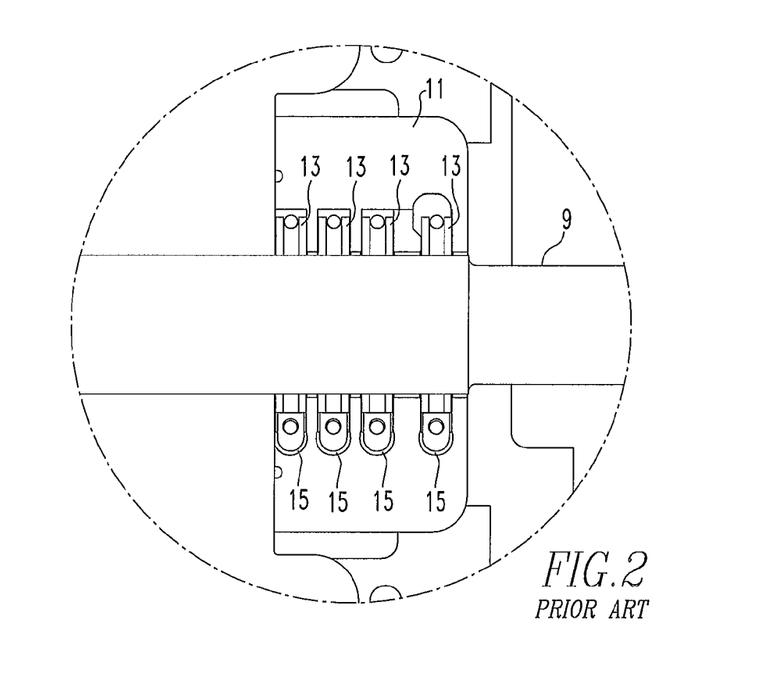
FIG. 2 is a portion of the top plan view of FIG. 1 enlarged for magnification purposes of the packing box.

With reference to FIGS. 1 and 2, a typical steam turbine 1 includes a casing 3 having an inlet end 5 and an exhaust end 7 and a rotor 9 extending through inlet end 5 and exhaust end 7 of casing 3. Packing boxes 11 are provided at inlet end 5 and exhaust end 7 of casing 3 around rotor 9. Packing boxes 11 are employed to seal an annular gap formed by rotor 9 penetrating through inlet end 5 and exhaust end 7 of casing 3.

Traditionally, carbon ring seals 13 have been installed in packing boxes 11 to limit the leakage of gases from casing 3 to the atmosphere. A plurality of carbon rings 13 are positioned within grooves 15 in each of packing boxes 11. Typically, multiple carbon ring seals 13 are positioned within each of packing boxes 11.

Carbon is used in the manufacture of the ring seals 13 because it provides a low friction surface to interact with the rotor 9 and packing boxes 11. However, carbon is a very brittle material and may fracture if too great of a load is applied thereto. Therefore, industry standards require a limitation of the differential pressure across a carbon ring to 35 psi. As a result, with carbon ring seals it is typically necessary to provide multiple seals along the shaft.

Accordingly, a need exists for a ring seal for use in a packing box that ensures low leakage through the rotor shaft-casing gap while also accommodating radial motion of the seal for shaft excursions. A further need exists for a ring seal that is manufactured from a durable material to prevent fracture when encountering a large differential pressure load. Provided according to this invention is a brush seal that can be used with existing packing boxes to replace most or all of the carbon ring seals.

SUMMARY OF THE INVENTION

An object of the present invention is to provide a ring seal for use in a packing box of a steam turbine that ensures low leakage through the rotor shaft-casing gap of the turbine to allow radial motion of the seal for shaft excursions. It is also an object of the present invention to provide a ring seal that is manufactured from a durable material to prevent fracture when encountering a large differential pressure load and/or high temperature differential.

Accordingly, the present invention is directed to a brush ring seal device for installation within a packing case of a turbine. The brush ring seal includes: a brush seal carrier having a substantially ring-shaped body portion having a front face, a rear face, an inner circumferential groove, and an outer circumferential groove; a brush seal mounted within the inner circumferential groove of the brush seal carrier; and a ring-shaped spring mounted within the outer circumferential groove of the brush seal carrier. The rear face of the brush seal carrier is coated with an anti-friction coating, thereby allowing movement of the brush ring seal within the packing case.

The brush seal carrier and brush seal may be each manufactured as two half segments or as rings then split, for example by EDM. The ring-shaped spring may be configured to retain the two half segments of the brush seal carrier together. The two half segments of the brush seal carrier may form a pair of axial slots at a joint thereof when coupled together. The brush seal carrier device may further comprise support tabs positioned within the axial slots at the joint of the two half segments. The anti-friction coating may include one of tungsten disulfide, molybdenum disulfide, Jet-Hot Piston-clad™, or Molybdenum and Nickel/Chrome. The brush seal carrier may be manufactured from metal.

The present invention is also directed to a turbine that includes: a casing having an inlet end and an exhaust end; a rotor extending through the casing between the inlet end and the exhaust end; a packing case surrounding the rotor at the inlet end and the exhaust end of the casing to provide sealing of an annular gap formed by the rotor extending through the inlet end and the exhaust end of the casing; and at least one brush ring seal device installed within the packing case. The brush ring seal device includes: a brush seal carrier having a substantially ring-shaped body portion having a front face, a rear face, an inner circumferential groove, and an outer circumferential groove; a brush seal mounted within the inner circumferential groove of the brush seal carrier; and a ring-shaped spring mounted within the outer circumferential groove of the brush seal carrier. The rear face of the brush seal carrier is coated with an anti-friction coating, thereby allowing movement of the brush ring seal within the packing case.

The brush seal carrier and brush seal may be each manufactured as two half segments or as rings then split, for example by EDM. The ring-shaped spring may be configured to retain the two half segments of the brush seal carrier together. The two half segments of the brush seal carrier may form a pair of axial slots at a joint thereof when coupled together. The brush seal carrier device may further comprise support tabs positioned within the axial slots at the joint of the two half segments. The anti-friction coating may include one of tungsten disulfide, molybdenum disulfide, Jet-Hot Piston-clad™, or Molybdenum and Nickel/Chrome. The brush seal carrier may be manufactured from metal.

The present invention is also directed to a method of sealing an annular gap formed by a rotor extending through a casing of a turbine between an inlet end of the casing and an exhaust end of the casing. The method includes the steps of: positioning a packing case to surround the rotor at the inlet end and the exhaust end of the casing; providing at least one brush ring seal device; and installing the brush ring seal device within the packing case to seal the annular gap. The brush ring seal device includes: a brush seal carrier having a substantially ring-shaped body portion having a front face, a rear face, an inner circumferential groove, and an outer circumferential groove; a brush seal mounted within the inner circumferential groove of the brush seal carrier; and a ring-shaped spring mounted within the outer circumferential groove of the brush seal carrier. The rear face of the brush seal carrier is coated with an anti-friction coating, thereby allowing movement of the brush ring seal within the packing case.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PRESENT INVENTION

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

With reference to FIGS. 3A, 3B, and 4-6, a brush ring seal device, denoted generally as reference numeral 21, includes a brush seal carrier that is split into a first half 25 and a second half 27. The components of the brush ring seal device 21 including the brush ring seal carrier, brush seal (described hereafter) and garter spring (also described hereafter) are spit in two half segments to enable placement of the brush ring seal device into the packing box and around the shaft being sealed. When assembled, first half 25 and second half 27 form a substantially ring-shaped body portion that has a front face 29, a rear face 31, an inner circumferential groove 33, and an outer circumferential groove 35. Front face 29 tapers toward the center of the ring shaped body portion, while the rear face 31 is substantially flat.

When installed within a packing box 11 of a steam turbine 1, rear face 31 faces toward the low pressure side and is in contact with packing case 11, and front face 29 faces the high pressure side. The packing box provides axial restraint of the brush ring seal device by providing a substantially flat radial face against which the rear face 31 of the brush ring seal device is pressed during pressurized use. The packing box provides no radial restraint on the brush seal ring while the ring is being emplaced. The bristles of the brush surrounding the shaft naturally align the brush ring seal device on the shaft. During pressurized use, friction between the rear face of the brush ring seal and the flat face against which it abuts tends to fix the radial position of the brush ring seal device. Small excursions of the shaft are accommodated by flexing of the bristles. Accordingly, rear face 31 has applied thereto a low-coefficient of friction coating to facilitate limited radial movement of brush ring seal device 21 should the rotor 9 contact brush ring seal device 21 during a more extensive excursion. The anti-friction coating may be any one of the following: tungsten disulfide, molybdenum disulfide, Jet-Hot Pistonclad™, or Molybdenum and Nickel/Chrome. However, this is not to be construed as limiting the present invention as it has been envisioned that any suitable anti-friction coating may be utilized depending on the sealed fluid parameters (e.g., temperature, pressure, corrosiveness). The coating permitting limited radial movement of the contact brush ring seal device protects the bristles from being permanently damaged during more extensive shaft excursions, and thus extends the life of the brush ring seal device and improves sealing. In addition, brush seal carrier 25, 27 may be manufactured from a metal material such as, but not limited to, grade 304 stainless steel, grade 410 stainless steel, or 17-14 ph stainless steel.

Figure 3A:
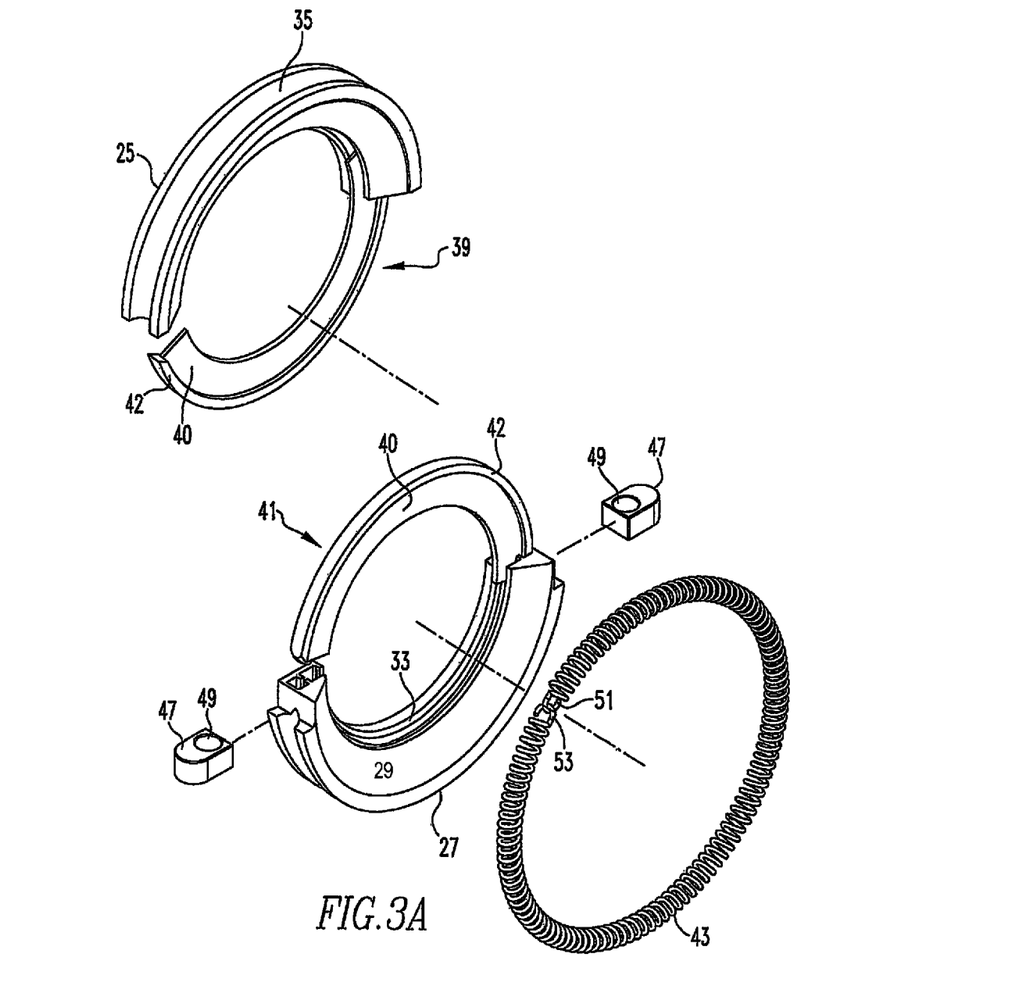
FIG. 3A is an exploded, front perspective view of a brush ring seal in accordance with the present invention.
Figure 3B:
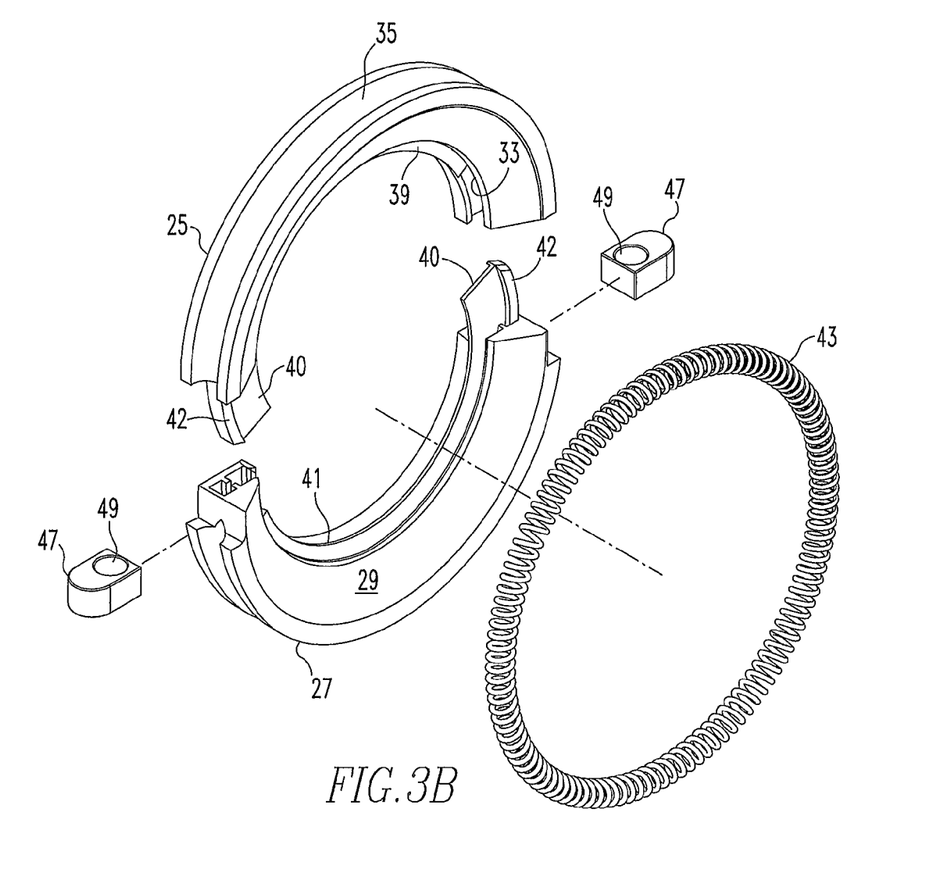
FIG. 3B is a partially assembled, exploded, front perspective view of the brush ring seal in accordance with the present invention.

Brush ring seal device 21 further includes a brush seal that is split into a first half 39 and a second half 41. When assembled, first half 39 and second half 41 form a substantially ring-shaped body portion that is sized and shaped to fit within inner circumferential groove 33 of brush seal carrier 25, 27. More specifically, first half 39 and second half 41 of brush seal each include a bristle strip 40 coupled to a retainer 42. Bristle strip 40 is manufactured from a plurality of bristles that are welded or clamped together. The bristles may be manufactured from Haynes 25, which is an alloy of cobalt, nickel, chromium, and tungsten. However, this is not to be construed as limiting the present invention as any suitable material may be used to manufacture the bristles. Retainer 42 is configured to slide within inner circumferential groove 33 of brush seal carrier 25, 27 during assembly as shown in FIGS. 3A and 3B. Brush seal 39, 41 functions to seal the radial gap between rotor 9 and brush seal carrier 25, 27, and brush seal carrier 25, 27 supports brush seal 39, 41 and acts as a face seal against packing box 11. As is well known in the art, the bristles of the brush seal approach the shaft at a slight angle to the radial extending toward the circumferential direction in which the shaft normally rotates. Ideally there is a slight clearance between the ends of the bristles and the surface of the shaft while the seal is not pressurized. Under pressure the bristles move into contact with the surface of the shaft.

Brush ring seal device 21 also includes a ring-shaped garter spring 43. Garter spring 43 is mounted within outer circumferential groove 35 of the brush seal carrier to retain first and second halves 25, 27, 39, and 41 of brush seal carrier and brush seal together once assembled around rotor 9 in packing box 11. When first half 25 and second half 27 of brush seal carrier are coupled together, a pair of axial slots 45 are formed at a joint thereof. While the figures show these axial slots 45 being formed in second half 27 of the brush seal carrier, this is not to be construed as limiting the present invention as axial slots 45 may also be formed in first half 25 of the brush seal carrier or formed in both first half 25 and second half 27 of brush seal carrier.

Figure 4:
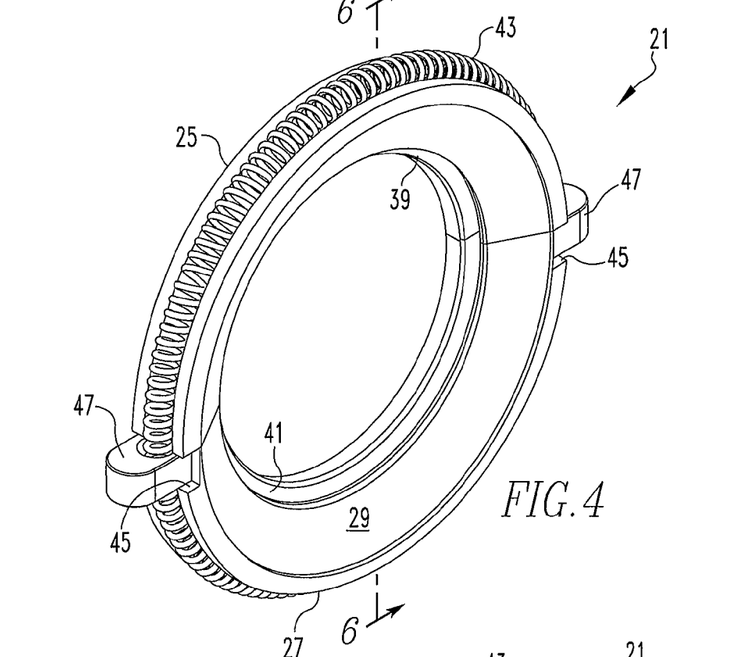
FIG. 4 is an assembled, front perspective view of the brush ring seal in accordance with the present invention.
Figure 5:
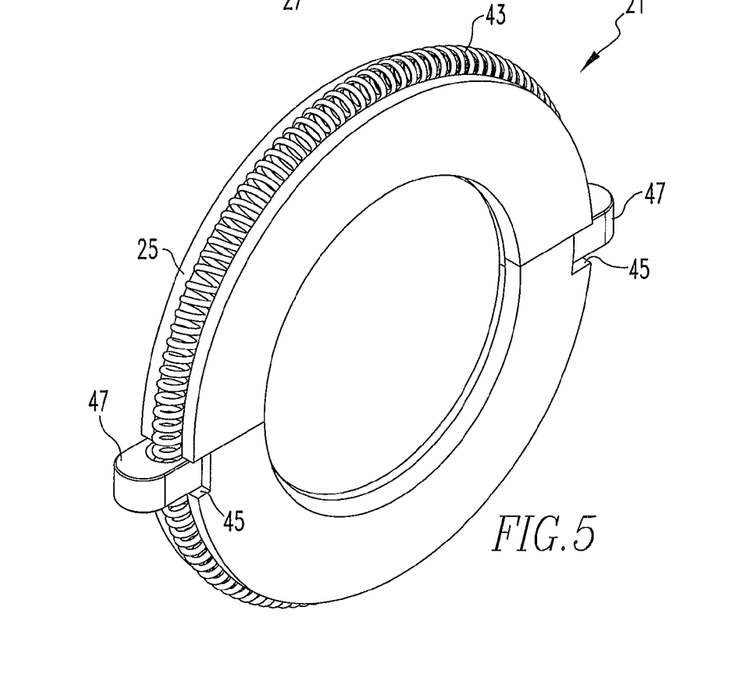
FIG. 5 is an assembled, rear perspective view of the brush ring seal in accordance with the present invention.
Figure 6:
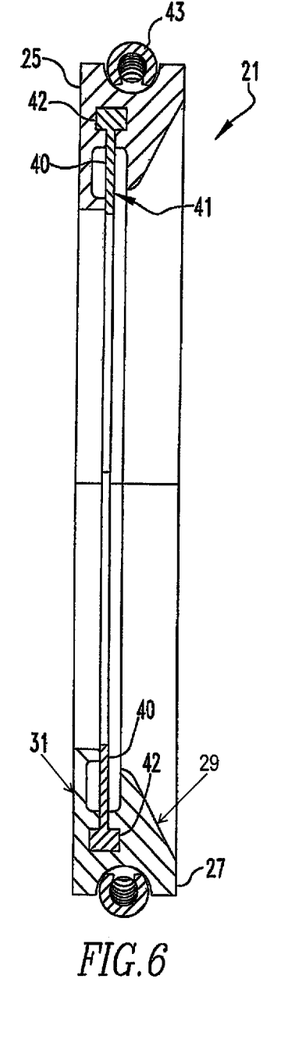
FIG. 6 is a cross-sectional view of the brush ring seal taken along line 6-6 in FIG. 4.

A pair of support tabs 47 is positioned within axial slots 45. Support tabs 47 support brush ring seal device 21 in packing case 11 during assembly and prevent rotation thereof until pressure is applied. In addition, each of support tabs 47 includes a hole 49. Garter spring 43 includes a first end 51 and a second end 53. First end 51 and second end 53 each include a hook as shown in FIG. 3A. During assembly, first end 51 is passed through a hole 49 in one of support tabs 47 and second end 53 is passed through a hole 49 of the other support tab 47 and then the first end 51 and second end 53 of garter spring 43 are coupled together using the hooks to form a ring-shaped garter spring 43 positioned within outer circumferential groove 35 as shown in FIGS. 4 and 5.

Figure 7:
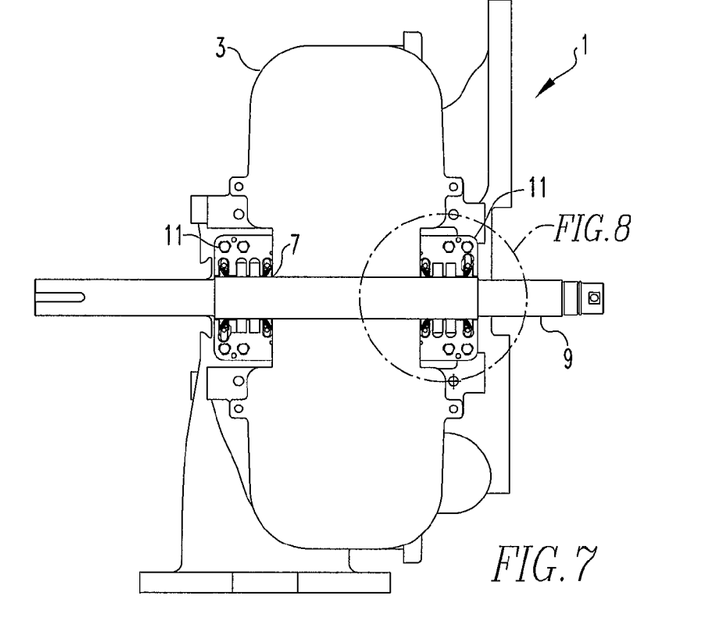
FIG. 7 is a top plan view of a steam turbine in partial cross-section that includes brush ring seals installed in the packing boxes in accordance with the present invention.
Figure 8:
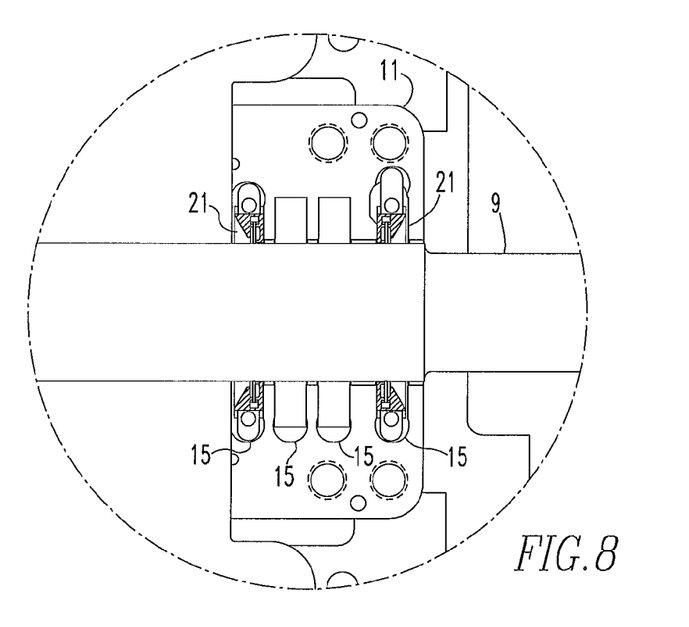
FIG. 8 is a portion of the top plan view of FIG. 7 enlarged for magnification purposes.

With reference to FIGS. 7 and 8 and with continuing reference to FIGS. 3A, 3B, and 4-6, in operation, brush ring seal device 21 is designed to seal an annular gap formed by rotor 9 extending through casing 3 of steam turbine 1 between inlet end 5 of casing 3 and exhaust end 7 of casing 3. Initially, first and second halves 25, 27, 39, and 41 of the brush seal carrier and brush seal are positioned around rotor 9 within packing box 11. Garter spring 43 is thereafter mounted within outer circumferential groove 35 of brush seal carrier 25, 27 to retain first and second halves 25, 27, 39, and 41 of the brush seal carrier and brush seal together. In addition, support tabs 47 are positioned within axial slots 45 to support brush ring seal device 21 in packing case 11 during assembly until pressure is applied.

When fluid begins to flow in the casing 3, a differential pressure is created across brush ring seal device 21, which creates an axial force pushing brush ring seal device 21 from the high pressure region toward the low pressure region. Without the anti-friction coating applied to rear face 31 of brush seal carrier 25, 27, brush ring seal device 21 would require a large force to move radially should rotor 9 contact brush seal carrier 25, 27. The use of an anti-friction coating on rear face 31 of brush seal carrier 25, 27 significantly reduces the force rotor 9 must exert on brush ring seal device 21 to move brush ring seal device 21, and hence less damage will occur to brush ring seal device 21 and rotor 9 during an impact.

In addition, a major advantage of brush ring seal device 21 is that it is not made from brittle carbon. Accordingly, brush ring seal device 21 can reliably withstand differential pressures as high as 500 psi. Consequently, fewer brush ring seal devices 21 are required to seal against high casing internal pressure. As shown in FIGS. 7 and 8, only two brush ring seal devices 21 may be required in each packing box 11 rather than multiple carbon seals. However, this is not to be construed as limiting the present invention as one brush ring seal device 21 may be utilized.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. A brush ring seal device for installation within a packing case of a turbine, the brush ring seal device comprising:
    a brush seal carrier having a substantially ring-shaped body having an axis of rotation consisting of two ring segments divided by a plane including the axis of rotation of the ring-shaped body, said brush seal carrier having a front axial face, a rear axial face, an inner circumferential groove, and an outer circumferential groove, said grooves being between the front and rear axial faces;
    a brush seal mounted within the inner circumferential groove of the brush seal carrier wherein the brush seal is manufactured as two half ring segments; and
    a ring-shaped spring mounted within the outer circumferential groove of the brush seal carrier,
    wherein the rear axial face of the brush seal carrier is coated with an anti-friction coating comprised of tungsten disulfide or molybdenum disulfide, thereby allowing movement of the brush ring seal device within the packing case, and
    wherein the two half segments of the brush seal carrier form a pair of axial slots at a joint thereof when coupled together, there being support tabs positioned within the axial slots at the joint of the two half ring segments, said tabs having holes therein for receiving the ring-shaped spring.

2. The brush ring seal device of claim 1, wherein the ring-shaped spring retains the two half ring segments of the brush seal carrier together.

3. The brush ring seal device of claim 1, wherein the brush seal carrier is manufactured from metal.

4. A turbine comprising:
    a casing having an inlet end and an exhaust end;
    a rotor extending through the casing between the inlet end and the exhaust end;
    a packing case surrounding the rotor at the inlet end and the exhaust end of the casing to provide sealing of an annular gap formed by the rotor extending through the inlet end and the exhaust end of the casing; and
    at least one brush ring seal device installed within the packing case, the brush ring seal device comprising:
        a brush seal carrier having a substantially ring-shaped body having an axis of rotation consisting of two ring segments divided by a plane including the axis of rotation of the ring-shaped body, said brush seal carrier having a front axial face, a rear axial face, an inner circumferential groove, and an outer circumferential groove said grooves being between the front and rear axial faces;
        a brush seal mounted within the inner circumferential groove of the brush seal carrier wherein the brush seal carrier is manufactured as two half ring segments; and
        a ring-shaped spring mounted within the outer circumferential groove of the brush seal carrier,
    wherein the rear axial face of the brush seal carrier is coated with an anti-friction coating comprised of tungsten disulfide or molybdenum disulfide, thereby allowing movement of the brush ring seal device within the packing case, and
    wherein the two half ring segments of the brush seal carrier form a pair of axial slots at a joint thereof when coupled together, there being support tabs positioned within the axial slots at the joint of the two half ring segments, said tabs having holes therein for receiving the ring-shaped spring.

5. The turbine of claim 4, wherein the ring-shaped spring retains the two half ring segments of the brush seal carrier together.

6. The turbine of claim 4, wherein the brush seal carrier is manufactured from metal.

7. A method of sealing an annular gap formed by a rotor extending through a casing of a turbine between an inlet end of the casing and an exhaust end of the casing, the method comprising:
    positioning a packing case to surround the rotor at the inlet end and the exhaust end of the casing;
    providing at least one brush ring seal device comprising:
        a brush seal carrier having a substantially ring-shaped body having an axis of rotation consisting of two ring segments divided by a plane including the axis of rotation of the ring-shaped body, said brush seal carrier having a front axial face, a rear axial face, an inner circumferential groove, and an outer circumferential groove, said grooves being between the front and rear axial faces;

a brush seal mounted within the inner circumferential groove of the brush seal carrier wherein the brush seal is manufactured as two half ring segments; and a ring-shaped spring mounted within the outer circumferential groove of the brush seal carrier; and installing the brush ring seal device within the packing case to seal the annular gap, wherein the rear axial face of the brush seal carrier is coated with an anti-friction coating comprised of tungsten disulfide or molybdenum disulfide, thereby allowing movement of the brush ring seal device within the packing case, and wherein the two half segments of the brush seal carrier form a pair of axial slots at a joint thereof when coupled together, there being support tabs positioned with the axial slots at the joint of the two half ring segments, wherein said tabs have holes therein for receiving the ring shaped spring.

8. The method of claim 7, wherein the ring-shaped spring retains the two half segments of the brush seal carrier together.

* * * * *